United States Patent

Evans et al.

[15] 3,644,199
[45] Feb. 22, 1972

[54] CONTROL OF CONTACT TIME IN TRANSPORT REACTORS

[72] Inventors: Richard E. Evans, Highland; Harold D. Zacher, Hammond, both of Ind.

[73] Assignee: Standard Oil Company, Chicago, Ill.

[22] Filed: May 27, 1970

[21] Appl. No.: 40,967

[52] U.S. Cl. ..........................208/120, 23/288 S, 208/153, 208/155
[51] Int. Cl. ................C01b 33/28, C10g 11/18, C10g 11/20
[58] Field of Search ........................208/120, 153; 23/288 S

[56] References Cited

UNITED STATES PATENTS

| | | | |
|---|---|---|---|
| 2,798,795 | 7/1957 | Rehbein et al. | 23/288 S |
| 3,355,380 | 11/1967 | Luckenbach | 208/153 |
| 3,406,112 | 10/1968 | Bowles | 208/153 |
| 3,440,020 | 4/1969 | Owen | 23/288 S |
| 3,492,221 | 1/1970 | Pfeiffer | 208/164 |

*Primary Examiner*—Delbert E. Gantz
*Assistant Examiner*—G. E. Schmitkons
*Attorney*—Arthur G. Gilkes, William T. McClain and Philip Hill

[57] ABSTRACT

Conversion of a petroleum stock is effected catalytically in a vertical, elongated transport reactor having an internal elongated open-ended tube closable at its upper end. Passage of the fluid catalyst-oil dispersion through the internal tube is controlled by the degree of closure effected by the positioning of the closure means. Intensity of conversion is regulated by selection of catalyst-oil ratio and control of dispersion velocity in response to the degree of closure.

10 Claims, 4 Drawing Figures

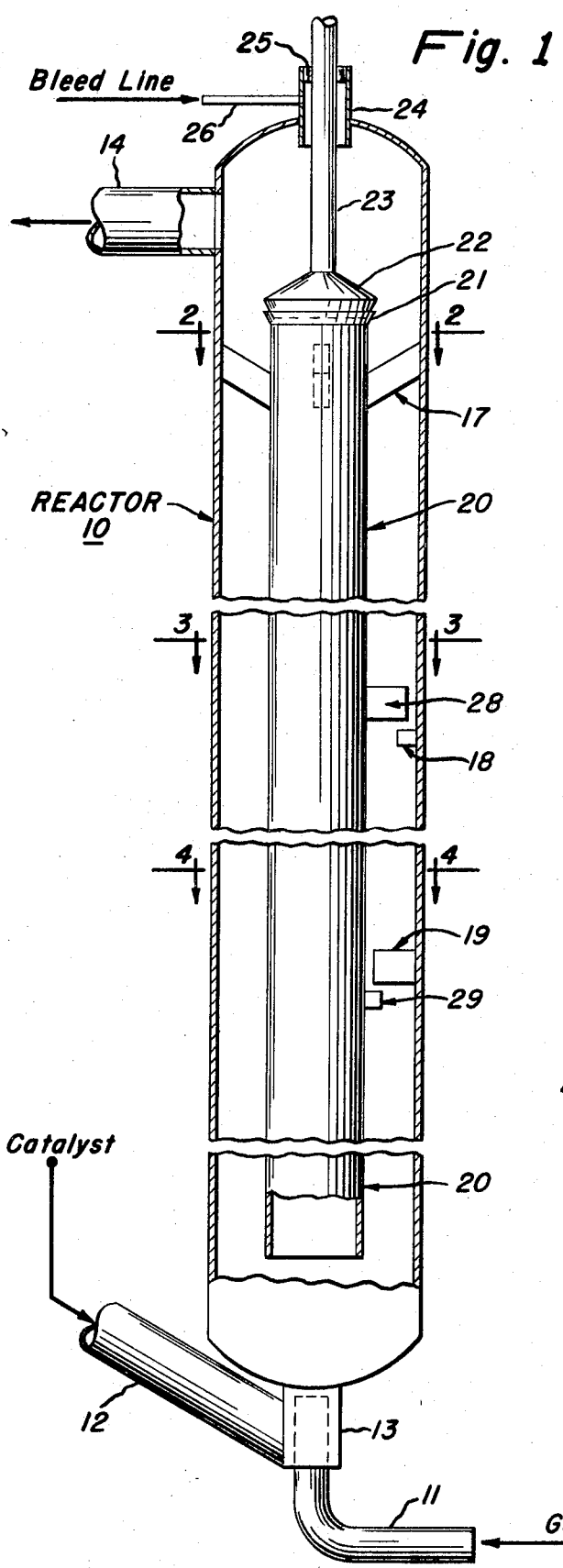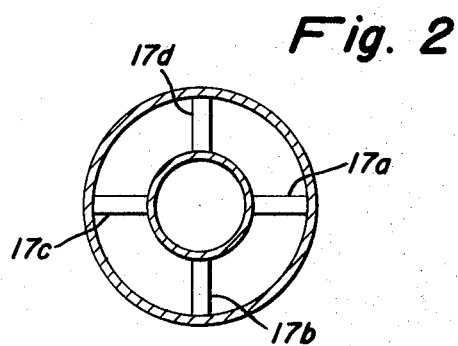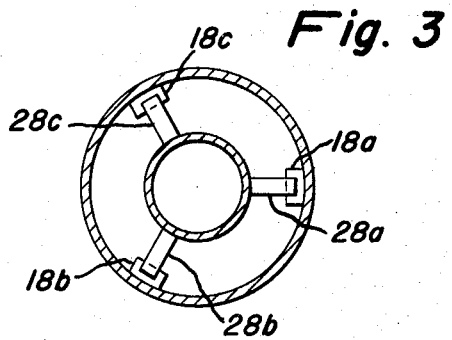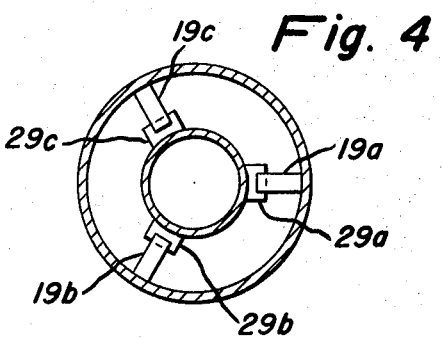
Fig. 1
Fig. 2
Fig. 3
Fig. 4
INVENTORS.
Richard E. Evans
Harold D. Zacher
BY Philip Hill
ATTORNEY

3,644,199

CONTROL OF CONTACT TIME IN TRANSPORT REACTORS

BACKGROUND OF THE INVENTION

Catalytic petroleum conversion, such as catalytic cracking, has been effected conventionally in a dense fluid-bed reactor system with a fluidizable catalyst, typically silica-alumina containing 10-30 wt. percent alumina. In an improved apparatus catalyst and oil have been contacted in a pipe and transported cocurrently, usually vertically, into a dense fluidized bed of catalyst. The amount of conversion of heavy petroleum, such as a gas oil, into lighter fractions, such as gasoline or kerosene, is a function of space velocity, a measure of the amount of catalyst seen by the oil and the length of time during which catalyst and oil are in contact. Historically, uncertainty in the space velocity requirement has been accommodated by designing for adequate catalyst inventory in the reactor. Seasonal variations in conversion requirements were met by adjusting the catalyst level in the dense-bed reactor.

Development of newer molecular sieve catalysts, usually combining a crystalline aluminosilicate with the conventional silica-alumina catalysts, has led to the utilization of previously recognized advantages of the dilute-phase transport reactor. This process is now customarily known as transfer-line cracking. Accordingly, the space velocity flexibility of the dense bed has been abandoned, although the need for such flexibility still exists.

SUMMARY OF THE INVENTION

This invention relates to a novel method for controlling dispersion velocity, and catalyst-oil contact time, in a transport reactor petroleum conversion process. This invention also relates to apparatus for effecting control of dispersion velocity in a vertical transport reactor.

Purposes of this invention are to provide a novel process for control of catalyst-oil contact time in a dilute-phase transport or "transfer-line" cracking reactor and to provide apparatus eminently suited to the simple practice of this novel process.

Novel control of velocity and contact time is achieved by providing a means for effectively altering the cross section area (and hence the volume) of the cracking reactor. This is done by providing an internal elongated concentric pipe which may be closed at its upper end in a controllable manner responsive to an external adjustment.

DESCRIPTION OF THE DRAWINGS

Exemplary of one manner for practicing our invention is the apparatus shown in FIG. 1. Details of construction are shown in FIGS. 2, 3 and 4, representing cross-sectional views looking downward at planes 2—2, 3—3 and 4—4, respectively.

Referring to FIG. 1, petroleum gas oil, together with recycle gas oil, is introduced into the coaxial entry tube 13 of vertical transport cracking reactor 10 through line 11 which extends into entry tube 13. Regenerated and/or fresh catalyst is introduced through standpipe 12 into the annular space between the walls of line 11 and tube 13. Appropriate metering, valving, and dispersion or fluidizing steam inlets are not shown.

The fluidized mixture of catalyst and gas passes upwardly through reactor 10 while catalytic cracking of the gas oil to valuable hydrocarbon fractions of greater volatility occurs. In the course of the cracking reaction coke deposits on the catalyst. At the top of reactor 10, the mixture of coked catalyst, petroleum conversion products and unconverted gas oil passes into exit line 14 and then into stripping, product recovery and catalyst regeneration facilities, not shown.

Centrally of reactor 10 there is suspended riser tube 20 which extends vertically from a point near the bottom of reactor 10 upwardly to a point below the exit line 14. The riser tube 20 terminates at its upper end in flared section 21, adapted to receive, as a valve, tapered plug 22. The position of tapered plug 22 relative to flared section 21 can be varied by vertical adjustment of rod 23 from snug contact, whereby upward flow through riser tube 20 is completely shut off, to effectively complete separation, whereby upward flow through riser tube 20 is in no way impeded. Steam purge means, not shown, is provided near the top of riser tube 20 to prevent catalyst and oil accumulation when the tube is closed. Additional purge means, not shown, may be provided near the bottom of the tube for use when the riser tube is partially open. By appropriate adjustment of rod 23, plug 22 can be positioned relative to flared section 21 so that a predetermined flow through tube 20 can be achieved, corresponding to the flow attainable with a smaller effective diameter thereof.

Rod 23 is movable vertically by control means, not shown, through guide sleeve 24, situated in the top wall of reactor 10 and coaxial therewith. Sleeve 24 terminates at its upper end in packing gland 25. The lower end of sleeve 24 is open to the reactor and any accumulation of catalyst or oil in the sleeve may be removed by bleeding steam through bleed line 26 either continuously or intermittently.

Riser tube 20 is supported from reactor 10 by four support lugs 17 equally spaced about each vessel and welded thereto, creating a downward angle of about 30° from the cross-sectional plane, normal to the reactor axis, designated as 2—2. FIG. 2 presents the cross-sectional view downwardly at plane 2—2, showing the placement of welded support lugs 17a, 17b, 17c, 17d at 90° intervals.

Along the length of riser tube 20 guides are installed at intervals together with emergency stops, attached alternately to riser tube and reactor wall. Three guide bars 28, welded at equal spacings about the circumference of riser tube 20 extend laterally toward but not into contact with reactor wall 10. The guide bars overlap three emergency stops 18 welded with equal spacing to the wall of reactor 10. FIG. 3 presents a downward cross-sectional view at plane 3—3, showing the respective positions of guide bars 28a, 28b, 28c and emergency stops 18a, 18b, 18c at 120° intervals. At a spaced lower position, three guide bars 19 welded to the wall of reactor 10 overlap three emergency stops 29 situated therebelow and attached to the wall of the riser tube 20. FIG. 4 presents a downward cross-sectional view at plane 4—4, showing the respective positions of guide bars 19a, 19b, 19c and emergency stops 29a, 29b, 29c at 120° intervals.

DESCRIPTION OF THE INVENTION

In any petroleum conversion process employing a fluid catalyst-oil dispersion in a vertical transport reactor, the intensity of the reaction may be varied by a controlled change in the upward velocity of the fluidized dispersion. This directly affects the contact time and, with a generally fixed catalyst circulation rate in a cyclic system, the effective space velocity as well. In our invention a separate riser tube is inserted within the vertical transport reactor. The bottom end of this pipe is open at all times. The top end of the riser pipe is fitted with a variable opening so that the degree of closure may be varied over the range from 0 to 100 percent. Accordingly, the effective volume of the transport reactor is varied in a controlled manner by changing its effective cross section area.

When the top of the riser pipe is wide open (0 percent closure) the riser tube is without effect except for the minor portion of the reactor volume occupied by its mass. When the top of the pipe is completely closed (100 percent closure) the volume enclosed by the riser tube becomes a dead space and the catalyst-oil fluid dispersion is forced to flow upward in the annular space between the tube and reactor walls. When the top end of the riser tube is partially open there is an impeded flow through the tube as well as flow through the annulus. An inert gas (or steam) purge in the lower portion of the riser tube may be employed to avoid formation of a dense fluidized zone. With a fixed oil feed rate, the velocity of flow will vary inversely with the effective cross section (or volume) of the reactor. In a given transport reactor, contact time will vary directly with the effective volume of the reactor.

This invention may be employed with any catalytic petroleum conversion process utilizing a fluidized-bed reactor system of the transport type. Such systems require cycling of catalyst to the reactor following suitable stripping and regeneration at frequent intervals. This invention is particularly adaptable to the catalytic cracking of petroleum fractions.

Suitable petroleum stocks include light gas oils, heavy gas oils, wide-cut gas oils, vacuum gas oils, kerosenes, decanted oils, residual fractions and cycle oils derived from any of these. Such fractions may be employed singly or in any desired combination.

Suitable catalysts include those containing silica and/or alumina. Other refractory metal oxides such as magnesia or zirconia may be employed limited only by their ability to be effectively regenerated under the selected conditions. With particular regard to catalytic cracking, preferred catalysts include combinations of silica and alumina, containing 10–50 wt. percent alumina, and their admixtures with "molecular sieves" or crystalline aluminosilicates. Admixtures of clay-extended aluminas may also be employed. Such catalysts may be prepared by any suitable method such as impregnation, milling, cogelling, and the like, subject only to provision of the finished catalyst in a physical form capable of fluidization.

Suitable "molecular sieves" include both naturally occurring and synthetic aluminosilicate materials, such as faujasite, chabazite, X-type and Y-type aluminosilicate materials, and ultrastable, large-pore crystalline aluminosilicate materials. The metal ions contained therein are exchanged in large part for ammonium or hydrogen ions by known techniques so that the sodium ion content is less than 0.5 wt. percent.

With particular reference to effective use of this invention in conjunction with a fluid catalytic cracking process, a wide variation in cracking conditions can be tolerated. In the usual case where a petroleum gas oil feed is employed, the throughput ratio (TPR), or volume ratio of total feed to fresh feed, may vary from 1.0 to 2.0. Conversion level may vary from 40 to 100 percent when effecting cracking at a temperature in the range from 850° to 1,050° F. Conversion is here defined as the percentage reduction of hydrocarbons boiling above 430° F. at atmospheric pressure by formation of lighter materials or coke. The weight ratio of catalyst to oil in the reactor may vary within the range from 2 to 20 so that the fluidized dispersion will have a density in the range from 1 to 10 pounds/cubic foot. Fluidizing velocity may be in the range from about 10 to about 60 feet/second, the higher velocities being achieved when the inner tube is closed.

This process arrangement is effective not only for varying the cracking intensity employed with a selected feedstock but also affords a degree of flexibility not otherwise available when employing segregated feedstocks exhibiting different susceptibilities to catalytic cracking. This process scheme is also attractive where either the fresh feed rate or the throughput rate may vary significantly at intervals and a substantially constant cracking intensity is desired. If refinery operation eventually dictates a continuously high fresh feed rate then the process may be operated at that time with the riser tube continuously in the fully open position, thus losing the novel flexibility of this invention but avoiding the need for constructing additional cracking facilities.

The apparatus of our invention is generally described in the drawings which also present one specific embodiment.

The vertical transport reactor is associated in a cyclic system with a stripping vessel, for removing volatile material from the spent catalyst and separating hydrocarbon conversion product for subsequent fractionation, and a regenerator, for burning coke from the catalyst and providing heat for the conversion reaction. Any conventional combination of such processing equipment may be employed with our invention. Suitable transport reactors preferably have a ratio of length to diameter above about 25 and a length in the range from 100 to 200 feet. A smaller-diameter entry tube section depends coaxially from the reactor to accommodate feedlines for oil and regenerated catalyst. Steam for dispersion and fluidization may also be added through the feedlines or separately as desired. Means for removing effluent fluidized dispersion of catalyst, oil and conversion products is provided near the top of the vertical reactor as a horizontally disposed exit tube leading to the associated separation facilities and stripper vessel.

The elongated riser tube is preferably a pipe extending from a point a short distance below the exit tube to a point a few feet above the entry tube. The inside diameter of this tube should be in the range from one-fourth to two-thirds the inside diameter of the transport reactor vessel. The riser tube may be supported within the reactor by any suitable means. One such means is the welded attachment of support lugs to both the pipe and the internal wall of the reactor, employing four such lugs on equal spacings and fashioned to extend downwardly from the reactor wall at an angle of about 30° from the plane normal to the wall as shown in FIGS. 1 and 2. Materials of construction must be selected such that thermal expansion and erosion problems are minimized. Preferably the riser tube and lugs are fashioned from the same metal or alloy used in the transport reactor wall. The length of the riser tube is great enough to require that internal sway be effectively eliminated. Any means for providing a series of stabilizing guides at intervals along the tube may suitably be employed, as for example the guide bars shown in FIGS. 1, 3 and 4.

Any suitable closure means may be employed at the top end of the riser pipe. The closure may conveniently be any plug valve or slide valve susceptible of controlled positioning to regulate the degree of closure. One such closure is the plug valve assembly shown in FIG. 1, comprising a flared top end of the pipe and a tapered plug adapted to fit snugly into the flared opening. The plug is attached to one end of a rod which can be positioned vertically in response to a suitable external control means. The closure means is necessarily subjected, when partially open, to erosive action of catalyst particles. Accordingly, the valve means employed should be faced with a suitable erosion-resistant composition.

The control rod extends upwardly through a guide sleeve, attached to the top wall of the reactor, fitted with a bleed line to prevent accumulation of catalyst and oil vapors and with a packing gland to preserve the positive pressure desired in the reactor environment.

EXAMPLES

The following examples are illustrative of our invention but are not set forth as a limitation on its reasonable scope.

EXAMPLE I

A Mid-Continent gas oil, boiling in the range 650–900° F., together with 20 20 percent recycle gas oil (TPR = 1.2) is pumped at 650° F. into the bottom section of a vertical fluid-bed transport reactor (180 feet high; 5 feet internal diameter) together with steam and sufficient regenerated and makeup fresh catalyst (silica-alumina containing molecular sieve) to provide a dilute-phase dispersion density of 4 pounds/cubic foot. As an internal the reactor contains a centrally located pipe (150 feet long; inside diameter, 2.5 feet; outside diameter, 2.6 feet) fitted at the top and with a plug valve which can be positioned vertically from a point outside and above the reactor. The fluid dispersion at a temperature of 950° F. is passed upward through the reactor at an initial velocity of 20 feet/second with the central pipe open. The final velocity is 40 feet/second at the exit line after a 7-second reaction time. Conversion is 70 vol. percent.

EXAMPLE II

The process of Example I is repeated with the plug valve on the top end of the central pipe closed. The fluid dispersion is passed upward through the reactor at an initial velocity of 20 feet/second. The final velocity is 50 feet/second at the exit line after a 5-second reaction time. Conversion is 65 percent.

We claim:

1. A process for the conversion of a petroleum stock in the presence of a fluidizable conversion catalyst in a vertical elongated transport reactor containing an internal, elongated, open-ended tube closable at the upper end, wherein the intensity of the conversion is regulated by control of the velocity of the upwardly moving petroleum-catalyst fluidized dispersion in response to the degree of closure imposed upon the upper end of the tube.

2. The process of claim 1 wherein an externally controlled plug valve is attached to the upper end of the internal tube to effect the imposed degree of closure.

3. The process of claim 1 wherein the petroleum stock is a petroleum gas oil.

4. The process of claim 1 wherein the conversion catalyst comprises a fluidizable solid selected from the class consisting of silica-alumina, silica-magnesia, and silica-zirconia.

5. The process of claim 4 wherein the catalyst additionally comprises a crystalline aluminosilicate.

6. The process of claim 5 wherein a petroleum gas oil is catalytically cracked at a temperature in the range from 850° to 1,050° F., a catalyst-oil weight ratio in the range from 2.0 to 20.0, and an upward fluid dispersion velocity in the range from about 10 feet per second with an open internal tube to about 60 feet per second with a closed internal tube.

7. In a cyclic fluid-dispersion catalytic cracking system, comprising in combination an elongated, vertical transport reactor, a spent-catalyst stripper, a catalyst regenerator and product recovery means, apparatus for catalytic cracking comprising:
   a. an elongated, vertical, cylindrical reactor vessel, having a bottom and a curved top;
   b. an entry tube, having a smaller diameter than the reactor vessel, coaxial therewith and extending downwardly from the bottom of the vessel, to receive oil feed and regenerated catalyst together with dispersion and fluidizing steam;
   c. an exit tube, located near the top of the reactor vessel and extending horizontally therefrom, whereby the catalyst-oil dispersion is removed from the reactor vessel;
   d. an elongated, vertical, cylindrical riser tube, contained within the cylindrical reactor vessel, having open bottom and top ends;
   e. riser tube support means, anchored to the inner wall of the reactor vessel and maintaining the riser tube coaxial with the reactor vessel at a distance below the top of the reactor vessel such that the top end of the riser tube is located below the exit tube;
   f. closure means, attached to the top end of the riser tube;
   g. a cylindrical guide sleeve, coaxial with the reactor vessel and the riser tube, attached to the top of the vessel and extending therethrough;
   h. rod means, attached to the closure means and extending upwardly through the guide sleeve; and
   i. control means, attached externally of the reactor to the rod means and adapted to movably adjust the vertical positioning of the rod means and the closure means, thereby varying the degree of closure of the top end of the riser tube within the range from a fully open to a fully closed position and effecting control of the upward velocity of the fluidized catalyst-oil dispersion.

8. The apparatus of claim 7 wherein the closure means comprises a plug valve.

9. The apparatus of claim 7 wherein stabilizing guide means are affixed to the riser tube and to the internal wall of the reactor vessel at intervals along their respective vertical lengths.

10. The apparatus of claim 7 wherein the ratio of inside diameters of the reactor vessel to the riser tube is in the range from 1.5 to 4.

* * * * *

PO-1050
(5/69)

UNITED STATES PATENT OFFICE
CERTIFICATE OF CORRECTION

Patent No. 3,644,199      Dated February 22, 1972

Inventor(s) Richard E. Evans and Harold D. Zacher

It is certified that error appears in the above-identified patent and that said Letters Patent are hereby corrected as shown below:

Col. 4, Line 52 reads: together with 20 20 percent should read: together with 20 vol. percent Signed and sealed this 13th day of June 1972.

(SEAL)
Attest:

EDWARD M. FLETCHER, JR.
Attesting Officer

ROBERT GOTTSCHALK
Commissioner of Patents